United States Patent [19]

Takahashi

[11] Patent Number: 5,337,241
[45] Date of Patent: Aug. 9, 1994

[54] SPACECRAFT ATTITUDE SENSOR HAVING AN OPTICAL APPARATUS FOR INCREASING APPLICATIONS THEREOF

[75] Inventor: Fumiho Takahashi, Tokyo, Japan
[73] Assignee: NEC Corporation, Japan
[21] Appl. No.: 994,716
[22] Filed: Dec. 22, 1992

[30] Foreign Application Priority Data

Dec. 24, 1991 [JP] Japan .................. 3-356189

[51] Int. Cl.$^5$ ................ G01S 5/08; G01S 1/44
[52] U.S. Cl. .................. 364/434; 356/218; 356/140; 356/3
[58] Field of Search ............. 364/434; 356/144, 141, 356/147, 140, 218, 3; 359/837

[56] References Cited

U.S. PATENT DOCUMENTS

| | | | |
|---|---|---|---|
| 3,020,407 | 2/1962 | Merlen | 250/83.3 |
| 3,118,063 | 1/1964 | Kaufman | 250/347 |
| 3,418,478 | 12/1968 | Falbel | 250/202 |
| 3,419,321 | 12/1968 | Barber et al. | 359/837 |
| 3,576,999 | 5/1971 | Blythe | 250/203 |
| 3,793,518 | 2/1974 | Harper | 250/83.3 H |
| 3,909,131 | 9/1975 | Waters | 356/3 |
| 3,986,774 | 10/1976 | Lawrey, Jr. et al. | 356/3 |
| 4,062,509 | 12/1977 | Muhlfelder et al. | 244/166 |
| 4,494,835 | 1/1985 | Hamid et al. | 351/158 |
| 4,628,206 | 12/1986 | Astheimer | 250/372 |
| 4,786,018 | 11/1988 | Cope | 244/164 |
| 4,792,684 | 12/1988 | Savoca | 250/347 |
| 5,048,774 | 9/1991 | Savoca | 244/171 |
| 5,267,015 | 11/1993 | Kai | 356/218 |

OTHER PUBLICATIONS

"Development of Precision Earth Sensor for ETS-V1 Satellite", F. Takahashi et al., No. 97 pp. 35–42 Apr. 1990.

Int. J. of Infrared and Millimeter Waves, Vol. 10, No. 8, 1989; "Pyroelectric Infrared Detector For Precision Earth Sensor" K. Nakamura et al., pp. 907–930.

Primary Examiner—Thomas G. Black
Assistant Examiner—Julie D. Day
Attorney, Agent, or Firm—Ostrolenk, Faber, Gerb & Soffen

[57] ABSTRACT

A spacecraft attitude sensor which determines roll-/pitch angles of a spacecraft, is disclosed. Two light ray detectors are provided in a manner to be canted by a predetermined angle with each other. Each of the two light ray detectors defines a "field of view" light beam channel. A scan mirror is arranged to reciprocally rotate, about a pitch axis of the spacecraft, between two predetermined angles. The scan mirror is positioned in front of the two light ray detectors so as to swing the field of view light beam channel. A prism is provided in front of the scan mirror and deviates the field of view light beam channel so as to allow the scan mirror to scan the Earth across limbs thereof. The provision of the prism is able to increase the application of the sensor.

6 Claims, 4 Drawing Sheets

SPACECRAFT ATTITUDE SENSOR HAVING AN OPTICAL APPARATUS FOR INCREASING APPLICATIONS THEREOF

BACKGROUND OF THE INVENTION

1. Field of the Invention

The present invention relates generally to a spacecraft attitude sensor, and more specifically to such a sensor which is equipped with an optical apparatus for effectively expanding the usage of the sensor by suitably deviating light rays entering the sensor.

2. Description of the Prior Art

Before turning to the present invention it is deemed advantageous to discuss a known spacecraft attitude sensor with reference to FIGS. 1-4.

Throughout the instant specification, an attitude sensor is discussed for a satellite in a geostationary orbit merely for the convenience of descriptions.

FIG. 1 is a schematic diagram showing a known attitude sensor 10 which is mounted on a three-axis stabilized satellite and which is arranged to detect the Earth 12 for satellite attitude determination. Such an attitude sensor is disclosed in articles: (a) entitled "Development of Precision Earth Sensor for ETS-VI Satellite" by Fumiho TAKAHASHI, et al., NEC Res. & Develop., No. 97, April 1990, Pages 35-42 and (b) entitled "Pyroelectric Infrared Detector for Precision Earth Sensor" by Kunio NAKAMURA, et al., International Journal of Infrared and Millimeter Waves, Vol. 10, No. 8, 1989.

As shown in FIG. 1, the spacecraft attitude sensor 10 is comprised of a scan mirror 14, a lens 16, and a pair of infrared detectors 18a, 18b. It is assumed that the satellite which is equipped with the sensor 10 is at an altitude of 35,786 km where the period of the satellite equals the sidereal rotation period of the Earth 12. The scan mirror 14 oscillates or reciprocates at 8 Hz about a pitch axis 19 within the range defined by from $\pm 12°$ to $\pm 15°$. The detectors 18a, 18b are canted by $\pm 6.07°$ (or $\pm 3.82°$) relative to the equator of the Earth 12.

It is assumed that the satellite is correctly orientated and thus at zero attitude angle. When the scan mirror 14 oscillates, the detectors 18a and 18b detect 15 μm infrared ($CO_2$ absorption band) at 45° north/south latitudes with the canted angles of $\pm 6.07°$. (If the canted angles are $\pm 3.82°$ then the detectors 18a, 18b detect same band infrared at 27° north/south latitudes.)

The detectors 18a, 18b define two "field of view" infrared beam channels, respectively. Each of two small circles 20a, 20b is called an instantaneous field of view (IFOV) which is determined by the shape of a received light spot and the optical characteristics of the lens 16. The horizontal scans in parallel with given north/south latitudes are respectively called "north side scan" and "south side scan". When the mirror 14 swings the field of view light beam channels, the IFOVs 20a, 20b move along the lines of the north/south side scans.

Although not shown in FIG. 1, the outputs of the infrared detectors 18a, 18b are applied to suitable electronics circuits and undergo digital signal processing.

Roll/pitch angles, which indicate satellite attitude errors, will be described with reference to FIG. 2 wherein two output pulses derived from the pair of detectors 18a, 18b are shown. Other than this, FIG. 2 is substantially identical with FIG. 1.

When the scan mirror 14 oscillates so as to swing the field of view infrared beam channels, the IFOVs 20a, 20b reciprocate along the north/south side scans. Thus, the detectors 18a, 18b detect the limbs of the Earth 12 and then generate electrical pluses 22a, 22b whose pulse widths are denoted by CWn, CWs, respectively. If the pitch axis 19, which passes through the center of the scan mirror 14, is selected as a reference pitch axis of the satellite, then the distances of the two limb detecting points from the axis 19 can be measured which are denoted by A and B in FIG. 2. Thus, roll and pitch angles relative to the center of the Earth 12 are given by $$\text{Roll angle} = Cr(CWs-CWn) \qquad (1)$$

$$\text{Pitch angle} = Cp(A-B) \qquad (2)$$

where Cr, Cp: constants previously determined.

Equations (1) and (2) are well known to those skilled in the art and hence further discussions thereof will be omitted for the sake of brevity.

The sensor 10 is designed for determining the satellite attitude at an altitude of about 36,000 km. Accordingly, the sensor 10 is rendered unavailable if the satellite is at a very high altitude of about 85,000 km (for example) or at a very low altitude of about 1,000 km (for example). These problems come from the fact that: (a) the canted angle is fixed to $\pm 6.07°$ (or $\pm 3.82°$) or (b) the mirror oscillating range can not be changed.

In more specific terms, if a satellite is located at a very high altitude of 85,000 km, the angle of view field of the Earth is as small as about 4°. In this case, as illustrated in FIG. 3, the north and south side scans fall outside the disk of the Earth 12 at the zero attitude of the satellite. This indicates that the roll angle of the satellite are no longer determined.

Contrarily, if a satellite is located at a very low altitude of 987 km, the angle of view field of the Earth becomes as large as about 60°. In this instance, as illustrated in FIG. 4, neither of the north/south side scans crosses the limbs of the Earth at the zero attitude. This indicates that the roll/pitch angles of the satellite can not be detected.

As mentioned above, the applications of the known sensor is strictly limited and hence, it is highly desirable to effectively increase the usage of the sensor in view of the high manufacturing cost thereof (for example).

SUMMARY OF THE INVENTION

It is an object of the present invention to provide a spacecraft attitude sensor whose applications can effectively be increased by simply adding an optical apparatus.

An aspect of the present invention comes in a spacecraft attitude sensor which is mounted on a spacecraft and which determines roll/pitch angles of said spacecraft relative to the center of the disk of a celestial body, said spacecraft attitude sensor comprising: two light ray detectors each of which is canted by a predetermined angle with each other, each of said two light ray detectors defining a field of view light beam channel; a scan mirror which is provided in front of said two light ray detectors and swings said field of view light beam channel between two predetermined angles; and an optical means which is provided in front of said scan mirror, said optical means deviating said field of view light beam channel such that said scan mirror scans said celestial body across limbs thereof by said field of view light beam channel.

BRIEF DESCRIPTION OF THE DRAWINGS

The features and advantages of the present invention will become more clearly appreciated from the following description taken in conjunction with the accompanying drawings in which like elements are denoted by like reference numerals and in which.

DETAILED DESCRIPTION OF THE PREFERRED EMBODIMENTS

Figure 5:
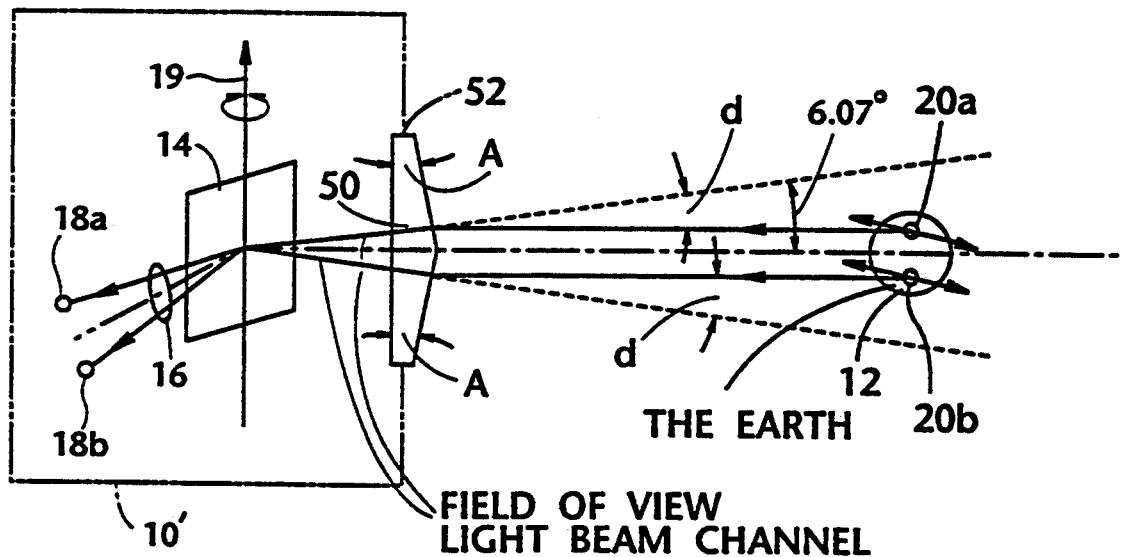
FIG. 5 is a sketch schematically showing a first embodiment of the present invention.

Reference is now made to FIG. 5, wherein a first embodiment of the present invention is schematically illustrated.

A sensor 10' is equipped with a prism 50 which is provided in an opening 52. The sensor 10' is mounted on a satellite at a very high altitude and acquires infrared rays via the prism 50. The prism 50 refracts or deviates the above mentioned "field of view" light beam channels such that the detectors 18a, 18b are able to detect the limbs of the Earth 12 even in the case where the canted angle is fixed to ±6.07° (for example).

Figure 1:
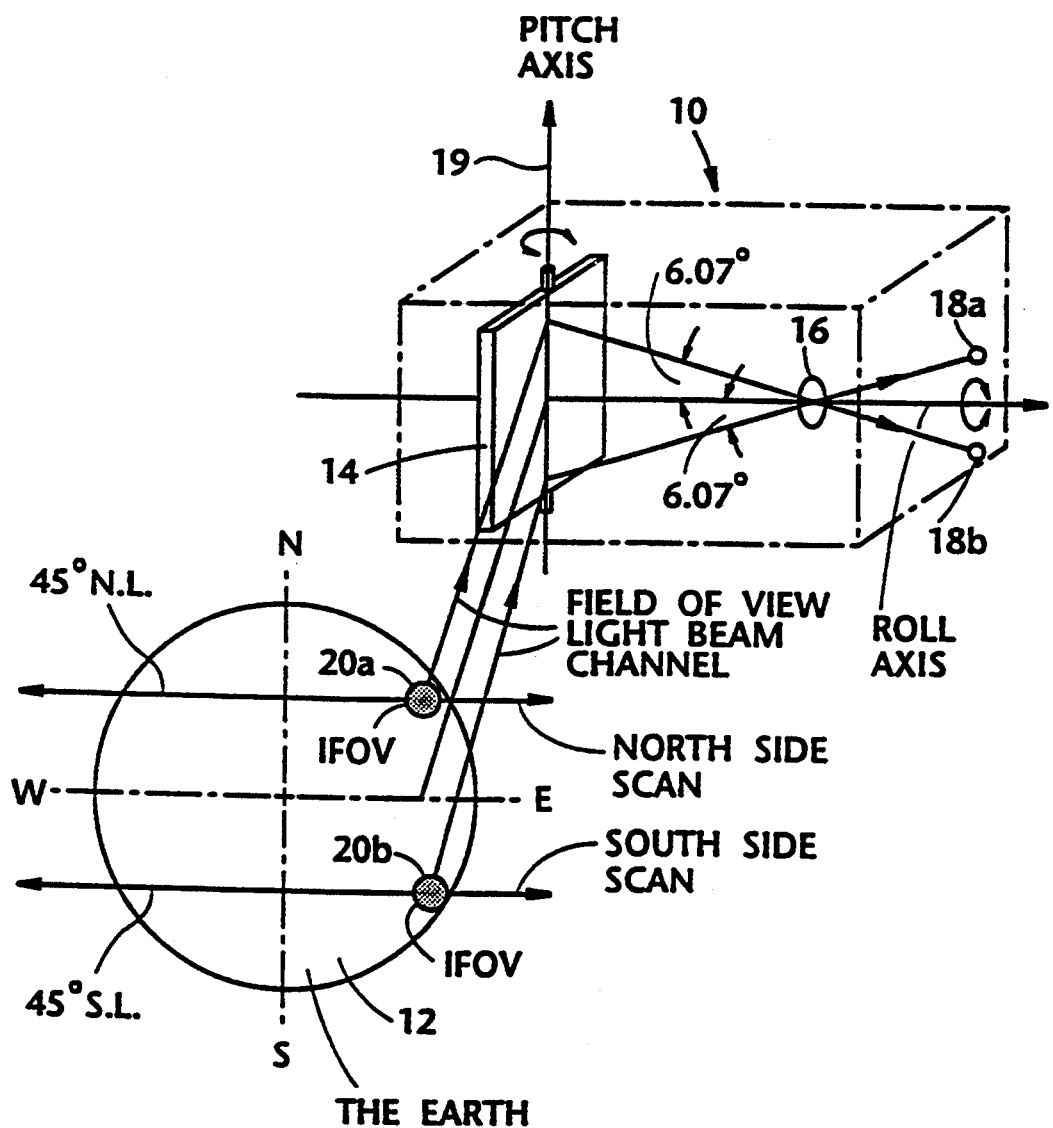
FIGS. 1 and 2 each is a sketch showing a known spacecraft attitude sensor which uses the Earth as a reference celestial body, these figures having been referred to in the opening paragraphs of the instant disclosure.
Figure 2:
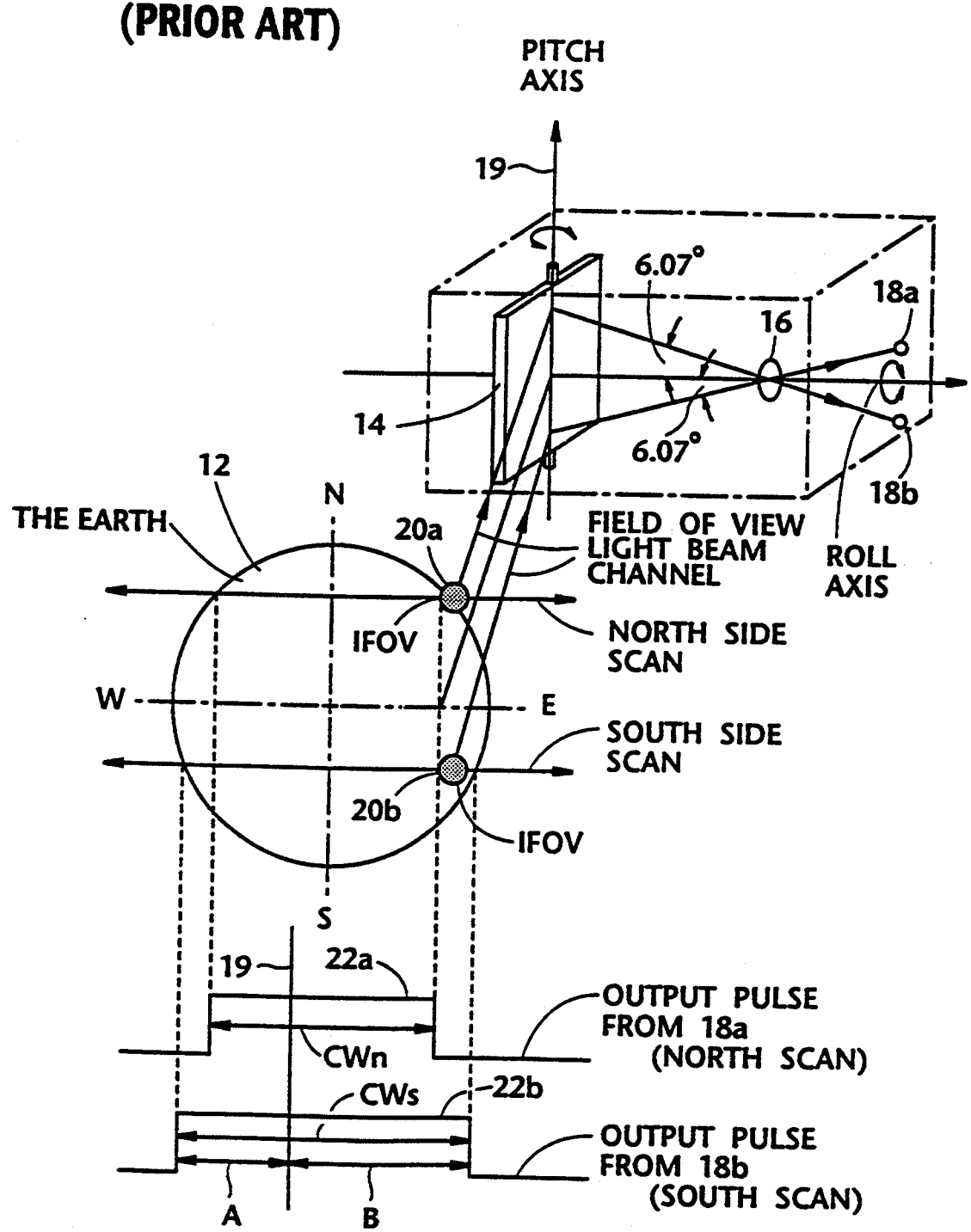
Figure 3:
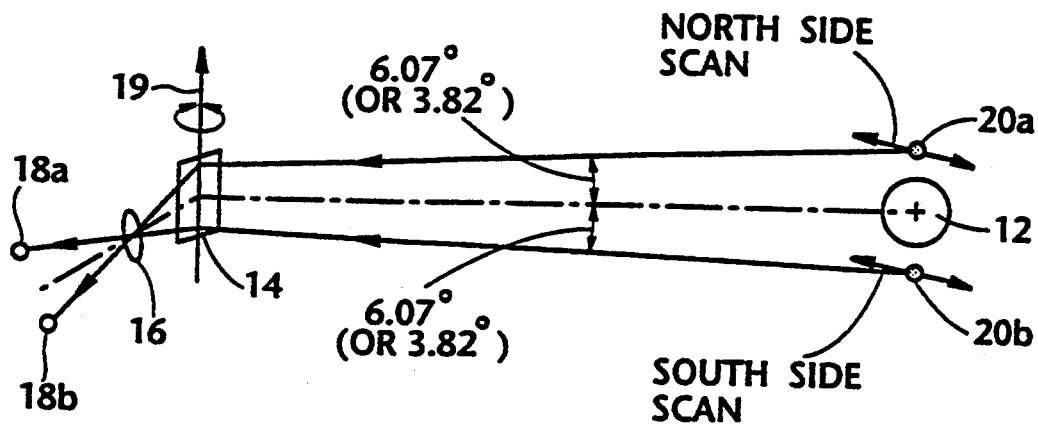
FIGS. 3 and 4 each is a sketch showing the difficulty which the known sensor of FIGS. 1 and 2 encounters, these figures having been referred to in the opening paragraphs of the instant disclosure.
Figure 4:
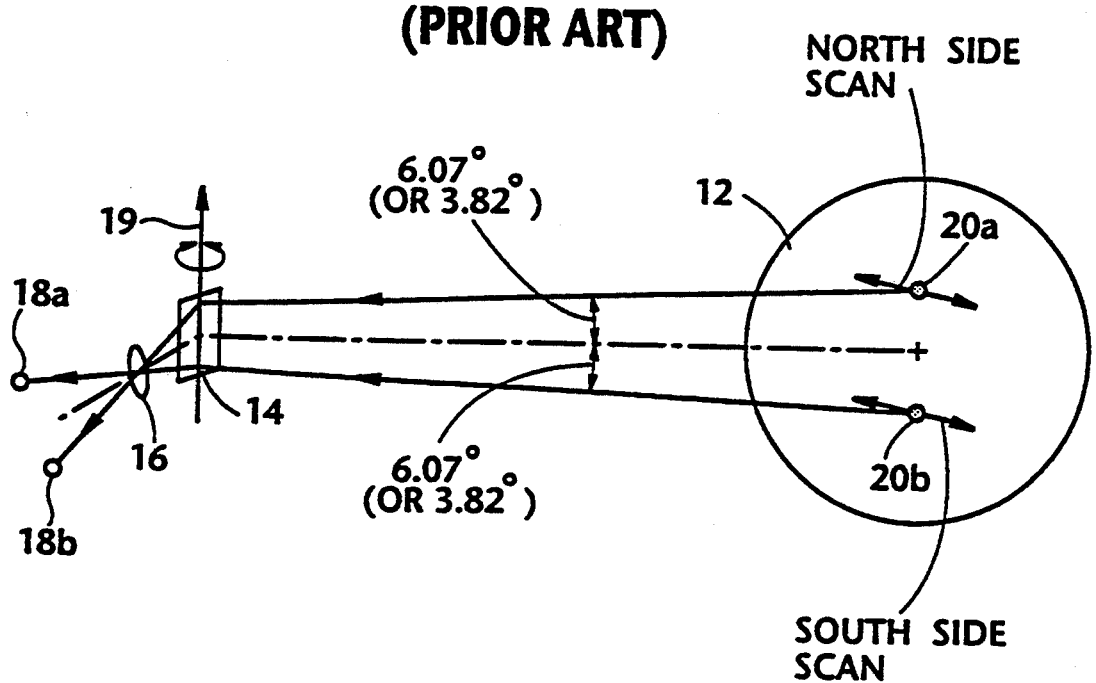

It is assumed that a satellite is located at a very high altitude of 150,000 km. In this case, the angle of view field of the Earth 12 is reduced to as small as 2.3° and accordingly, the aforesaid prior art is no longer able to detect the roll angle of the satellite relative to the center of the disk of the Earth 12, as previously referred to with reference to FIG. 3.

However, the provision of the prism 50 effectively makes possible the use of the above mentioned known sensor even in such a case. In more specific terms, let the index of the prism 50 be "n", and let the included angle at the apex be A. Then, the angle of deviation "d" is given by $$d = (n-1)A \quad (3).$$

If the known sensor 10 of FIGS. 1–4 with the canted angle of ±6.07 should be modified so as to scan the north/south 45° latitudes of the Earth 12, the infrared rays of the field of view light beam channels, incident on the prism 50, should be deviated as follows:

$$d = 6.07° - (2.3°/2) = 4.92° \quad (4).$$

When the prism 50 is made of Ge, the index of refraction thereof is 4.00 for the infrared of wave length 15 μm. Thus, the apex angle A of the prism 50 is determined by $$A = 4.92°/(4.00-1) = 1.64° \quad (5).$$

Accordingly, if such a kind of prism is used to deviate the incoming infrared rays of the field of view light beam channels, the known sensor 10 can be utilized to detect the roll angle error of the satellite even at such a high altitude.

Figure 6:
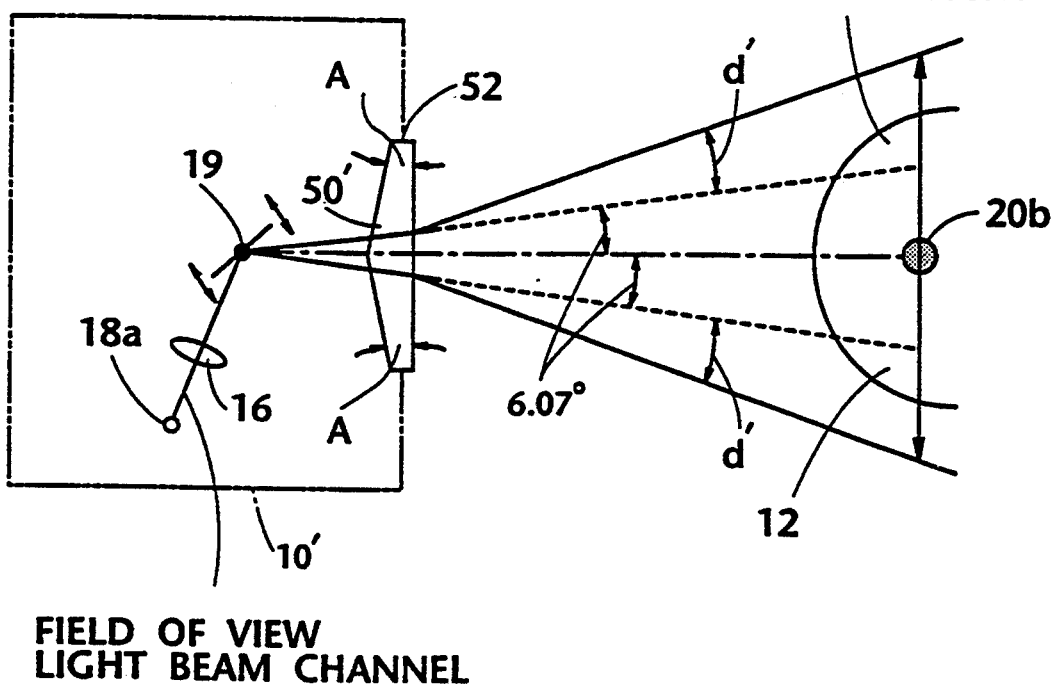
FIG. 6 is a sketch schematically showing a second embodiment of the present invention.

FIG. 6 illustrates a second embodiment of the present invention which is suited for the case where the sensor 10' is mounted on a satellite at a very low altitude. A prism 50' is provided to effectively deviate the field of view infrared rays incident thereon.

For example, it is assumed that a satellite is located at a low altitude of 1,000 km. In this instance, the range of each of the north/south side scans should be broadened by more than ±10° (denoted by d') in order to detect the limbs of the Earth 12. Thus, $$d' = (n-1)A = 10° \quad (6).$$

As in the first embodiment, if the prism 50' is made of Ge then the included angle at the apex A of the prism 50' is given by $$A = 10°/(4.00-1) = 3.3° \quad (7).$$

Accordingly, if such a prism is utilized for the purpose of outwardly deviating the infrared rays incident thereon, the known sensor can be used to detect the roll/pitch attitude angles of the satellite even at such a low altitude.

As mentioned above, the present invention is able to effectively increase the applications of the known sensor by simply incorporating a prism the apex angle of which is determined depending upon the altitude of the satellite.

In the foregoing, the present invention has been discussed with the Earth as a reference celestial body. However, the present invention is usable with the moon and the other planets as well.

It will be understood that the above disclosure is representative of two possible embodiments of the present invention and that the concept on which the present invention is based is not specifically limited thereto.

What is claimed is:

1. A spacecraft attitude sensor which is mountable on a spacecraft and which determines roll/pitch angles of said spacecraft relative to a center of a disk of a celestial body, said spacecraft attitude sensor comprising:
   two light ray detectors each of which is canted by a predetermined angle relative to the other of said detectors, each of said two light ray detectors defining a field of view light beam channel;
   a scan mirror which is provided in front of said two light ray detectors to swing said field of view light beam channel between two predetermined angles; and
   an optical means which is provided in front of said scan mirror, said optical means being effective to deviate said field of view light beam channel such that said scan mirror may scan said celestial body across limbs thereof by said field of view light beam channel, including at positions of said spacecraft relative to said celestial body at which said scan mirror is incapable of determining said roll-/pitch angles.

2. A spacecraft attitude sensor as claimed in claim 1, wherein said optical means is a prism.

3. A spacecraft attitude sensor as claimed in claim 1, wherein said celestial body is the Earth.

4. A spacecraft attitude sensor as claimed in claim 1, wherein said celestial body is a planet.

5. A spacecraft attitude sensor as claimed in claim 1, wherein said spacecraft is a geostationary satellite.

6. A spacecraft attitude sensor as claimed in claim 1, wherein said scan mirror reciprocally rotates around a pitch axis of said spacecraft and between said two predetermined angles.

* * * * *